March 24, 1942.  C. B. SPASE  2,277,273
FRICTION CLUTCH
Filed May 31, 1940
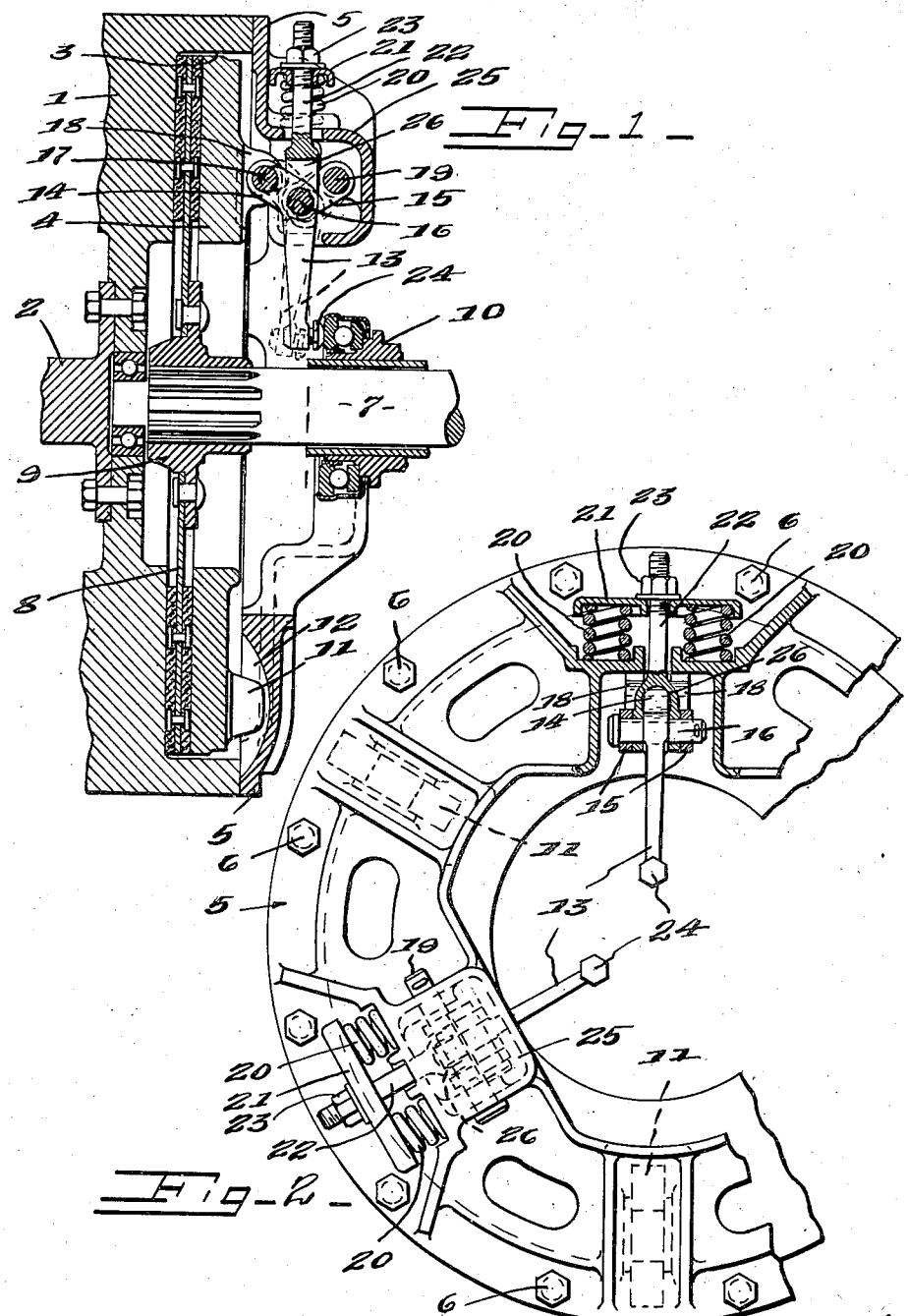
Charles B. Spase.
INVENTOR.
BY Bidwell & Thompson
ATTORNEYS.

Patented Mar. 24, 1942

2,277,273

UNITED STATES PATENT OFFICE 2,277,273

FRICTION CLUTCH

Charles B. Spase, Nedrow, N. Y., assignor to W. C. Lipe, Inc., Syracuse, N. Y., a corporation of New York Application May 31, 1940, Serial No. 338,067

8 Claims. (Cl. 192—68)

The invention relates to friction clutches, such as are used in the automotive industry, and has for its object a spring loaded clutch in which the springs are located outside of the back plate with the clutch levers or clutch mechanism located within the back plate structure.

It also has for its object an arrangement whereby the clutch springs acting on the levers are located outside the back plate and radially outward from the levers and near the rim of the back plate, whereby they are easily accessible for replacement and adjustment.

It also has for its object toggles for transferring the clutch engaging force, the toggles being normally folded and movable toward straightened position to engage the clutch and being arranged to compensate for clutch wear and for dying off or weakening of the clutch springs.

It further has for its object the arrangement of springs and clutch levers whereby the centrifugal force effective on the clutch levers acts in conjunction with the springs to move the clutch into engaged position and also an arrangement of toggles in the clutch mechanism which move toward straightened position to engage the clutch, and hence compensate for clutch wear and dying off or weakening of the clutch springs, and also increase the clutching force, as the toggles straighten toward but short of a straight line.

It further has for its object an arrangement of the clutch levers and the connection between them and the back plate and the pressure ring in the form of a toggle normally folded inward toward the axis of the clutch and movable outward toward straightened position to engage the clutch with the toggles so arranged that the joint thereof moves radially outward under the action of the clutch springs and under the action of the centrifugal force effective on the levers.

It further has for its object a particularly simple, efficient and economical arrangement of the back plate structure, the clutch levers and the mechanism or toggles operated thereby, and of the clutch springs acting on the toggles located outside of the back plate structure.

The invention consists in the novel features and in the combinations and constructions hereinafter set forth and claimed.

In describing this invention, reference is had to the accompanying drawings in which like characters designate corresponding parts in all the views.

Figure 1 is a diametrical sectional view through the clutch embodying this invention.

Figure 2 is a fragmentary rear elevation, partly in section.

The clutch comprises driving and driven elements, a pressure ring rotatable with the driving element and opposed to the same, the driven element including a clutch shaft, and a discoidal plate splined thereon and slidable axially thereof, the plate extending between the pressure ring and the driving element, a back plate structure secured to the driving element, and clutch operating mechanism including a throw-out collar slidable axially along the shaft, clutch levers operated thereby and extending radially relatively to the clutch shaft and operatively connected at their inner ends to the throw-out collar and the back plate structure, and clutch springs acting radially outward on the connections between the levers, the back plate and the pressure ring.

1 designates the driving element, which is here shown as applied to or mounted on a drive shaft, as the engine shaft 2, it being formed with a coaxial cylindrical recess 3 opening through its rear face. 4 designates the pressure ring which is rotatable with the driving element 1. 5 is the back plate secured at its edge to the driving element 1, as by screw bolts 6. 7 designates the clutch shaft extending axially into the recess 3, and 8 the friction disk having a hub 9 slidably splined on the shaft 7, the plate or disk 8 extending between the pressure ring 4 and the bottom of the recess 3, and having friction facings on opposite sides thereof.

10 designates a suitable throw-out collar or bearing slidable axially along the shaft 7, it being operable by any of the usual mechanisms, as the yoke or fork, not shown, which is usually operated by the clutch pedal of a motor vehicle. The pressure ring 4 is here shown as provided with driving lugs 11 on its rear side which interlock in recesses 12 in the inner face of the back plate, these lugs and recesses being the driving connection through which the pressure ring 4 rotates with the driving element 1.

13 designates the clutch levers, these extending radially in a plane and at a right angle or normal to the axis of the shaft 7, when the clutch is engaged, each lever being formed with an angular arm 14 at the outer end forming one link of a toggle, the other link 15 of which is pivoted to the lever 13 at the angle thereof. The pivot 16 constitutes the joint of the toggle. The links of the toggle are pivoted at their outer ends to the pressure ring and the back plate. As here shown, the arms 14 are pivoted at 17 to lugs 18 on the pressure ring and the links 15 to the back plate at 19. The toggle is folded inwardly toward the axis of the shaft 7 and moves outward toward a straight dead center line passing through the pivots 17 and 19 to engage the clutch.

20 designates springs acting to straighten the toggle, these springs being located outside of the back plate near the rim thereof and acting in a radial direction outward in substantially a straight line with the levers 13, when the clutch is engaged. The springs 20 are here shown as interposed between an abutment 21 on a link or stem 22 which is connected to the joint 16 of the toggle. The compression of the springs is adjusted by means of nuts 23 threading on the outer ends of the links or stems 22 against the outer face of the abutment 21. The levers 13 at their inner ends are provided with suitable adjusting screws 24 coacting with the throw-out collar 10, these being adjustable to equalize the pressure of the springs on the pressure rings. As here shown, in the interest of compactness, there are two springs 20 for each stem or link 22.

The back plate is formed to be rigid and is preferably cast metal. It is here shown as formed with rearwardly extending boxlike portions 25 housing at least the outer ends of the levers and the toggle mechanism and the pivot 19 for the link 15 of the toggle is mounted in the side walls of the boxlike housing. The link or stem 22 is formed bifurcated as at 26 at its inner end and arranged astride the hub or pivoted end of the lever 13. The link 15 is also formed double or bifurcated, as seen in Figure 2, and mounted on the pivot 16, that is, the joint of the toggle on opposite sides of the bifurcations 26 of the stem or link 22.

In operation, the levers 13 are normally arranged radial, so that the centrifugal force effective on the levers 13 tends to straighten the toggles to engage and hold the clutch engaged to compensate for dying out or weakening of the springs, and also to keep the capacity of the clutch equal to and greater than the original capacity as long as the toggles stop short of a straight or dead center line. Owing to the arrangement of the toggle, any wear of the clutch facings is taken up automatically by the tendency of the toggle to assume a position as close as possible to its dead center line, that is, the line passing through the pivots 17 and 19. Obviously, folding of the toggle will release the pressure ring 4. When it is necessary to adjust the springs or reset the toggle into a further folded position, the nuts 23 may be turned, and owing to the arrangement of the springs outside of the back plate, the springs and the nuts are readily accessible.

What I claim is:

1. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element, and a back plate rotatable with the driving element; the combination of clutch operating mechanism including a throw-out collar slidable axially along the shaft, levers extending radially relatively to the clutch shaft and coacting at their inner ends with the throw-out collar and toggle means for transferring the movement of the levers to the pressure ring, arranged with the joint of the toggle movable radially outward to straighten the toggle during engagement of the clutch and inward during disengagement thereof, a link connected to the joint of the toggle and extending radially outward, and a spring arranged outside of the back plate to thrust outwardly on said link.

2. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element, and a back plate rotatable with the driving element; the combination of clutch operating mechanism including a throw-out collar slidable axially along the shaft, levers extending radially relatively to the clutch shaft and coacting at their inner ends with the throw-out collar, and toggle means including links joined together and thrusting against the pressure ring and the back plate, one of the links being an arm rigid with and angular to the lever, the toggle extending in a general direction parallel to the axis of the clutch, so that the joint of the toggle moves radially outward during the engagement of the clutch and inward during disengagement thereof, a link connected to the joint of the toggle and extending radially outward, a spring interposed between the back plate and the outer end of the link to thrust radially outwardly on said link, the radial portions of the levers and the link against which the spring acts being arranged in a radial line when the clutch is engaged.

3. In a friction clutch including driving and driven elements, a pressure ring opposed to the driving element and rotatable therewith, the driven element including a clutch shaft, and a friction plate rotatable therewith and shiftable axially thereof, the plate extending between the pressure ring and the driving element, and a back plate rotatable with the driving element; the combination of clutch operating mechanism including a throw-out collar slidable axially along the clutch shaft, levers extending radially relatively to the clutch shaft and coacting at their inner ends with the throw-out collar, each lever having an angular arm at its outer end forming one link of a toggle, and a link pivoted at one end to the lever at the junction of the lever and its angular arm and constituting the other link of the toggle, the toggle links being pivotally connected at their outer ends to the back plate and the pressure ring, the toggle folding inwardly toward the axis of the shaft and located radially to the inward from a line passing through the pivot points of the toggle link to the pressure ring and the back plate and movable outward toward said line to engage the clutch, the lever being arrannged so that the centrifugal force acts outwardly through the joint of the toggle during rotation of the driving member, and hence holds the clutch engaged and compensates for wear of the clutch.

4. In a friction clutch including driving and driven elements, a pressure ring opposed to the driving element and rotatable therewith, the driven element including a clutch shaft, and a friction plate rotatable therewith and shiftable axially thereof, the plate extending between the pressure ring and the driving element, and a back plate rotatable with the driving element; the combination of clutch operating mechanism including a throw-out collar slidable axially along the clutch shaft, levers extending radially relatively to the clutch shaft and coacting at their inner ends with the throw-out collar, each lever having an angular arm at its outer end forming one link of a toggle, and a link pivoted at one end to the lever at the junction of the lever and its angular arm and constituting the other link of the toggle, the toggle links being pivotally connected at their outer ends to the back plate and the pressure ring, the toggle folding inwardly toward the axis of the shaft and located radially inward of a straight line passing through the pivot points of the toggle link to the pressure ring and the back plate, and movable toward said line to engage the clutch, the lever being arranged so that the centrifugal force acts outwardly through the joint of the toggle during rotation of the driving member, and hence holds the clutch engaged and compensates for wear of the clutch, and spring means carried by the back plate and acting on the toggle outwardly radially and tending to shift the clutch into engaged position, and means for transferring the force of the spring to the toggle.

5. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element, and a back plate rotatable with the driving element; the combination of clutch operating mechanism including a throw-out collar slidable axially along the shaft, levers extending radially relatively to the clutch shaft and coacting at their inner ends on the throw-out collar, toggle means including links joined together and thrusting against the pressure ring and the back plate, one of the links being an arm rigid with and angular to the lever, the toggle extending in a general direction parallel to the axis of the clutch, so that the joint of the toggle moves radially outward during engagement of the clutch and inward during disengagement thereof, a link connected to the joint of each toggle and extending radially outward, a spring arranged to thrust outwardly on each link, the radial portions of the levers and the link against which the spring acts being arranged in a radial line when the clutch is engaged, the spring being located outside of the back plate near the rim thereof and the toggle links and at least the adjacent portions of the levers being located within the back plate.

6. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element and a back plate rotatable with the driving element; the combination of clutch operating mechanism including a throw-out collar slidable axially along the shaft, clutch levers extending radially relatively to the clutch shaft and coacting at their inner ends with the throw-out collar and operatively connected to the pressure ring and the back plate to engage the clutch under the action of the centrifugal force, springs also operatively connected to the levers to engage the clutch and act in conjunction with the centrifugal force, the clutch levers extending within the back plate and the springs being located on the outside of the back plate radially outward from the levers, and means for adjusting the tension of the springs from the outside of the back plate.

7. In a friction clutch including driving and driven elements, a pressure ring opposed to the driving element and rotatable therewith, the driven element including a clutch shaft and a friction plate rotatable therewith shiftable axially thereof, the plate extending between the pressure ring and the driving element and a back plate rotatable with the driving element; the combination of mechanism operable to engage and disengage the clutch including a throw-out collar shiftable axially along the shaft, levers extending radially relatively to the clutch shaft and coacting at their inner ends with the throw-out collar, toggle links pivotally connected respectively to the pressure ring and to the back plate and so arranged that their joints move radially relative to the axis of the clutch and movable radially outward toward straightened position to engage the clutch, the levers being pivoted to the joints of the toggles and like links of the toggles being annular arms on the levers, a connecting link extending radially outward through the back plate and being connected at its inner end to the toggle and having an abutment at its outer end and spring means between the abutment and the back plate and acting to pull the connecting link outward and straighten the toggle.

8. In a friction clutch including driving and driven elements, a pressure ring opposed to the driving element and rotatable therewith, the driven element including a clutch shaft and a friction plate rotatable therewith and shiftable axially thereof, the plate extending between the pressure ring and the driving element and a back plate rotatable with the driving element; the combination of clutch operating mechanism including a throw-out collar shiftable axially of the shaft, toggle links pivoted together at like ends and at their other ends respectively to the back plate and to the pressure ring, the toggle links being foldable radially inward toward the axis of the clutch, the pivotal joint of the toggle being movable outwardly toward a straight line passing through the pivotal points of the links to the pressure ring and the back plate to engage the clutch, spring means acting radially relative to the axis of the clutch on the toggle links and tending to straighten the same toward said straight line to engage the clutch, and a radially extending lever coacting at its inner end with the throw-out collar, one of the links of the toggle being angular to the lever at the outer end thereof and rigid therewith, whereby the lever is fulcrumed at a pivotal point of the toggle links.

CHARLES B. SPASE.